US005659714A

United States Patent [19]
Yoshida

[11] Patent Number: 5,659,714
[45] Date of Patent: Aug. 19, 1997

[54] DATA PROCESSOR INCLUDING MEMORY FOR ASSOCIATING DATA ELEMENTS OF TWO-DIMENSIONAL ARRAY WHICH ARE NUMBERED IN SPIRAL ORDER WITH ELEMENT NUMBERS THEREOF

[75] Inventor: Toyohiko Yoshida, Hyogo, Japan

[73] Assignee: Mitsubishi Denki Kabushiki Kaisha, Tokyo, Japan

[21] Appl. No.: 498,384

[22] Filed: Jul. 5, 1995

[51] Int. Cl.⁶ .............................. G06F 17/30; G06F 12/08
[52] U.S. Cl. .................. 395/497.01; 395/456; 395/474; 395/480; 395/497.04; 395/412; 395/612; 395/621
[58] Field of Search ........................ 395/724.05, 728.05, 395/611, 612, 613, 621, 401, 403, 427, 444, 445, 456, 474, 480, 497.01, 497.04, 412

[56] References Cited

U.S. PATENT DOCUMENTS

| 4,841,435 | 6/1989 | Papenberg | 395/250 |
| 5,247,632 | 9/1993 | Newman | 395/401 |
| 5,586,256 | 12/1996 | Thiel et al. | 395/200.03 |

OTHER PUBLICATIONS

The 17th Annual Symposium on Computer Architecture, Jun. 1990, pp. 1–13, Anant Agarwal, et al., "Apr.: A Processor Architecture for Multiprocessing".
IEEE Transactions on Computers, vol. C–36, No. 7, Jul. 1987, pp. 845–858, Daniel A. Reed, et al., "Stencils and Problem Partitionings: Their Influence on the Performance of Multiple Processor Systems".
Tien–Pao Shih et al., "Grouping Array Layouts to Reduce Communication and Improve Locality of Parallel Programs," 1994 Int'l Conf. on Parallel and Distributed Systems, IEEE, pp. 558–566.
Chi–Hung Chi et al., "Reducing Memory Latency Using a Small Software Driven Array Cache," 1995 Annual Hawaii Int'l Conf. on System Sciences, vol. I, IEEE, pp. 202–210.

*Primary Examiner*—Paul V. Kulik
*Attorney, Agent, or Firm*—Oblon, Spivak, McClelland, Maier & Neustadt, P.C.

[57] ABSTRACT

There is disclosed a data processor in which the execution of a program, typically classical relaxation, for accessing a large number of data elements on edges of a multi-dimensional array requires a smaller number of buffer lines or cache lines and a smaller number of packets for a buffer memory or cache memory to transmit packets for holding and controlling groups of a plurality of data elements at sequential addresses in a memory, accomplishing efficient data processing. A shared-memory multiprocessor system which is an example of the data processor comprises nodes (N) each including a memory (45) for associating data elements of two-dimensional array which are numbered in spiral order with element numbers thereof to store the data elements at sequential addresses, a cache memory (43) for accessing a main memory of another node by means of packet transmission, and computing elements (41, 42).

5 Claims, 10 Drawing Sheets

| | | | | j-th COLUMN ↓ | | | |
|---|---|---|---|---|---|---|---|
| 49 | 48 | 47 | 46 | 45 | 44 | 43 | 42 |
| 50 | 25 | 24 | 23 | 22 | 21 | 20 | 41 |
| 51 | 26 | 9 | 8 | 7 | 6 | 19 | 40 |
| 52 | 27 | 10 | 1 | 0 | 5 | 18 | 39 |
| 53 | 28 | 11 | 2 | 3 | 4 | 17 | 38 |
| 54 | 29 | 12 | 13 | 14 | 15 | 16 | 37 |
| 55 | 30 | 31 | 32 | 33 | 34 | 35 | 36 |
| 56 | 57 | 58 | 59 | 60 | 61 | 62 | 63 | i-th ROW → (points to row with 53)

```
void main()
{
 allocate (even arrays);
 allocate (odd arrays);
 for (k=1;k<=ITERATIONS;k++)
     {
       do parallel(i th,1,number of threads;j th ,1,number of threads)
         {
           for (i=i th start;i<=i th start+thread size;i++)
             {
               for (j=j th start;j<=j th start+thread size;j++)
                 {
                   odd array[i][j]  —— 2 3 1
                   =(even array[i+1][j]+even array[i-1][j]
                    +even array[i][j+1]+even array[i][j-1]/4.0;
                 }
             }
         }
       do parallel(i th,1,number of threads;j th ,1,number of threads)
         {
           for (i=i th start;i<=i th start+thread size;i++)
             {
               for (j=j th start;j<=j th start+thread size;j++)
                 {
                   even array[i][j]—— 2 3 2
                   =(odd array[i+1][j]+odd array[i-1][j]
                    +odd array[i][j+1]+odd array[i][j-1]/4.0;
                 }
             }
         }
     }
}
```

FIG. 8
(PRIOR ART)

|   |   |   |   | ↓ j-th COLUMN |   |   |   |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 | i-th ROW → (row starting with 32)

DATA PROCESSOR INCLUDING MEMORY FOR ASSOCIATING DATA ELEMENTS OF TWO-DIMENSIONAL ARRAY WHICH ARE NUMBERED IN SPIRAL ORDER WITH ELEMENT NUMBERS THEREOF

BACKGROUND OF THE INVENTION

1. Field of the Invention

The present invention relates to a technique applicable to a data processor of a multiprocessor construction and the like and, more particularly, to a data processor of a multiprocessor construction for operating a plurality of data elements processing mechanisms in parallel to distribute loads for faster processing time. In particular, the invention relates to a technique suitable for a data processor for partitioning data elements on a multi-dimensional array into a plurality of sub-arrays to assign one or more sub-arrays to each node for parallel data processing.

2. Description of the Background Art

Jacobi relaxation is a classical relaxation process used for calculation of heat conduction problem and the like. For a two-dimensional plane as an example, this process repeatedly determines a data value of each grid point on the two-dimensional plane in a relaxation calculation cycle by calculating the average of data values of its four adjacent grid points in the immediately previous relaxation calculation cycle to converge the data value of each grid point in an area of interest on a value determined by exteriorly established boundary conditions.

Figure 7:
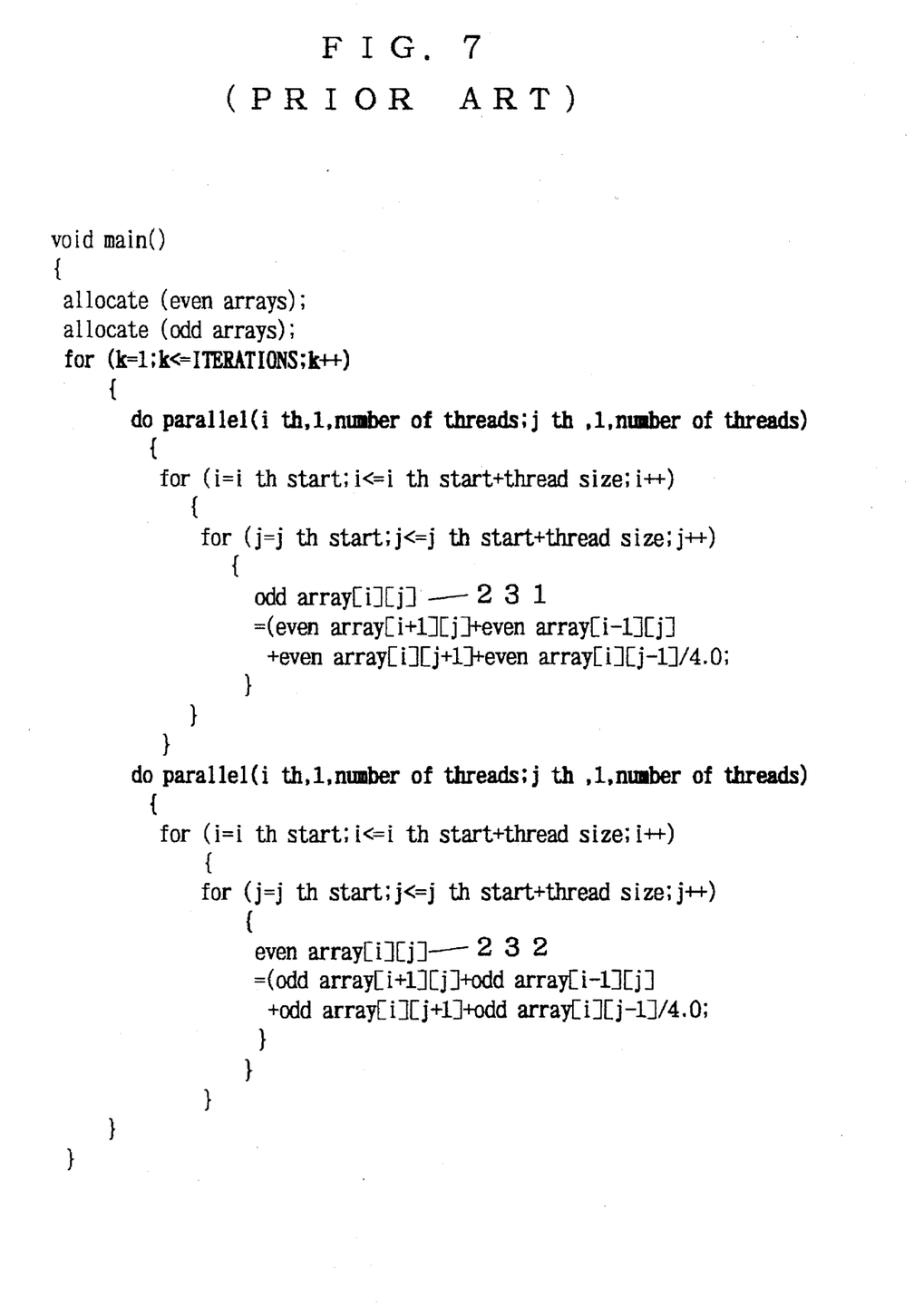
FIG. 7 illustrates an example program when Jacobi relaxation which is one of the classical relaxation processes is implemented in a multiprocessor system.

FIG. 7 illustrates an example program when arithmetic processing using the Jacobi relaxation is implemented in a shared-memory multiprocessor. The example program of FIG. 7 uses two two-dimensional arrays (231, 232) to hold data elements of one of the partitioned sub-arrays. In odd-numbered relaxation calculation cycles, the value of each data element in the sub-array 231 is calculated by using the values of four data elements in the sub-array 232. In even-numbered relaxation calculation cycles, the value of each data element in the sub-array 232 is calculated by using the values of four data elements in the sub-array 231. In this manner, the Jacobi relaxation changes the values of the respective data elements included in sub-arrays for each relaxation calculation cycle.

Figure 8:
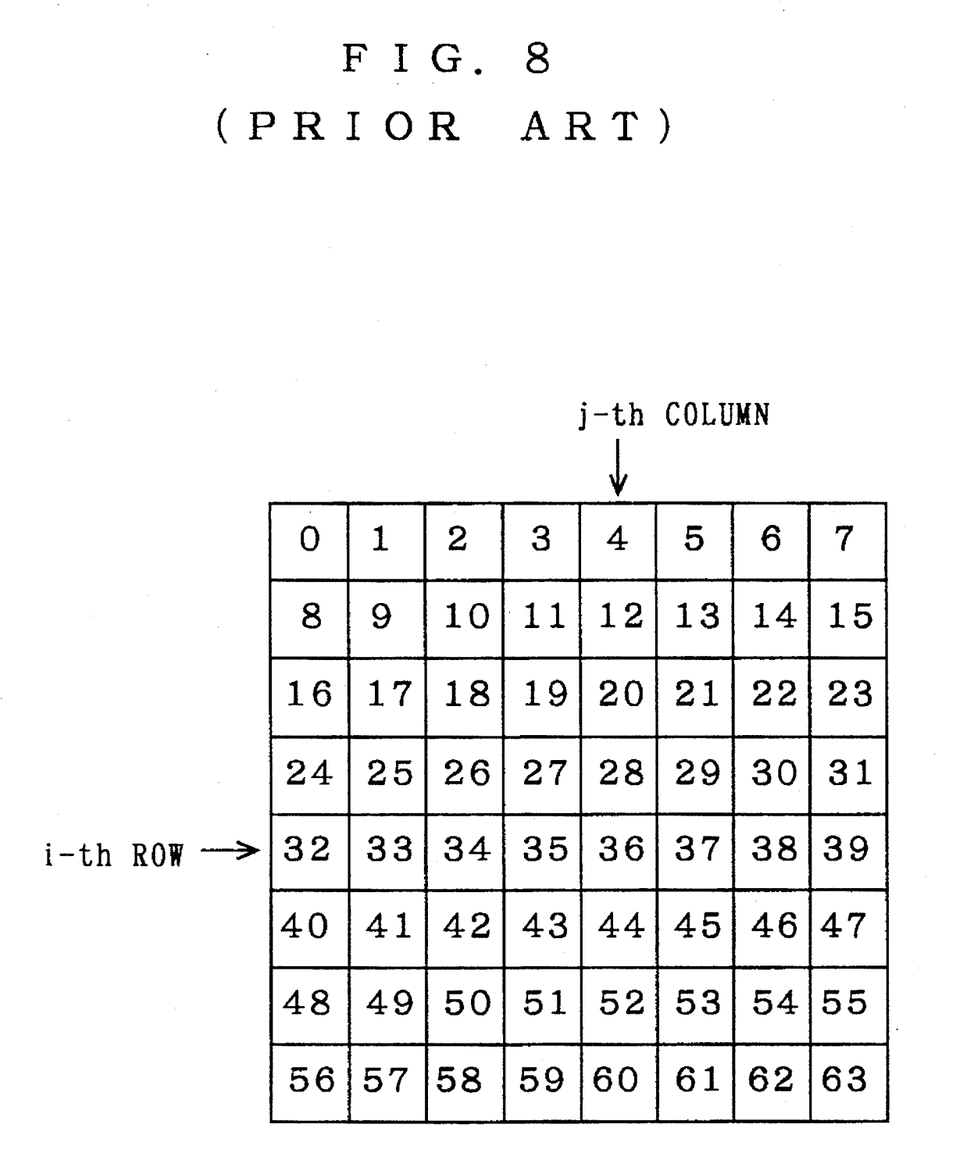
FIG. 8 illustrates a conventional two-dimensional array data structure.

In a conventional data processor, as shown in FIG. 8, data elements at two-dimensional grid points A2 (i, j) have been sequentially numbered in a direction parallel to the rows of the two-dimensional array for association with data elements at one-dimensional grid points A1 (k) $\{k=8\times(i-1)+(j-1)\}$. Then the two-dimensional data array has been transformed into a one-dimensional data array, and the respective data elements have been located in a memory at addresses corresponding to one-dimensional element numbers in the transformed one-dimensional data array.

Figure 9:
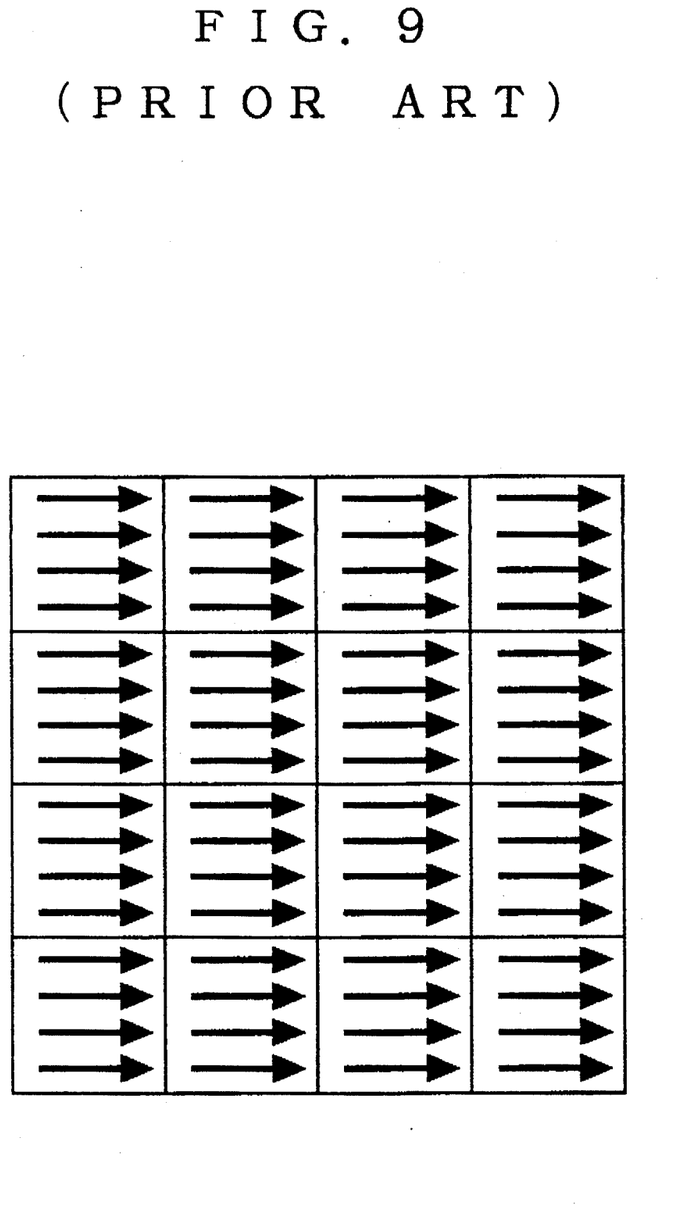
FIG. 9 conceptually illustrates an arrangement of data elements when the whole two-dimensional array data are partitioned into files using a two-dimensional array of a conventional data structure.

With the above stated Jacobi relaxation processed by a shared-memory multiprocessor, the whole data array are partitioned into a plurality of tile-shaped sub-arrays as shown in FIG. 9 to distribute loads to processor nodes. In the conventional data processor, since the data elements of the respective sub-arrays are arranged as shown in FIG. 9, the data elements on the edges parallel to the rows of a sub-array have sequential element numbers, but the data elements on the edges parallel to the columns thereof have non-sequential element numbers.

Figure 10:
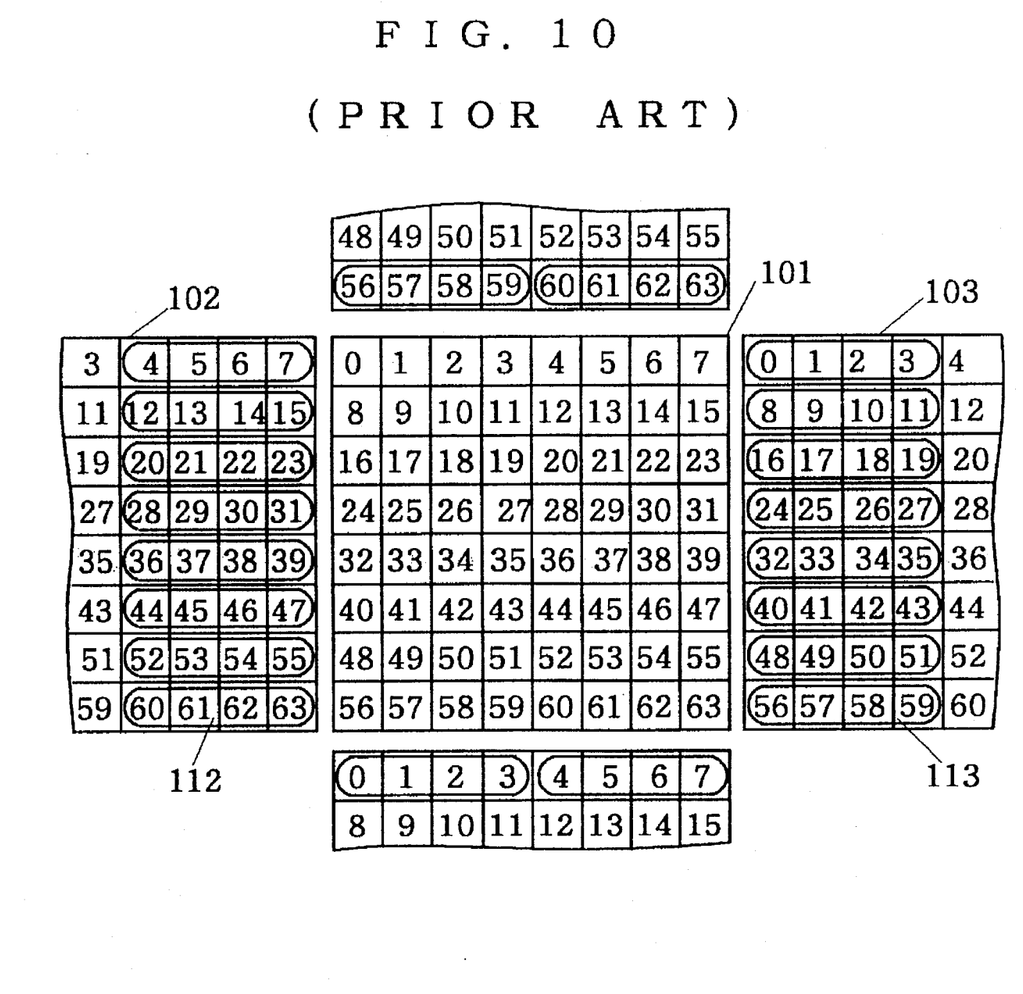
FIG. 10 illustrates an arrangement of data element for a conventional data processor, with each group of data elements loaded into one cache line when data elements on the edges of the adjacent sub-arrays are accessed.

FIG. 10 illustrates the element numbers of the respective data elements located adjacent the sub-array boundary in a data structure used for the conventional data processor. It will be understood from the example of FIG. 10 that each pair of data elements opposed across the boundary between two adjacent sub-arrays have different element numbers in the conventional data processor, and it is hence necessary to separately calculate the element numbers of the opposed data elements.

One data element and four adjacent data elements are to be calculated in the minimum program processing unit in the Jacobi relaxation shown in FIG. 7. Thus the calculation of the data elements in one sub-array provided by partitioning the whole data array requires only the data elements located on the edges of four sub-arrays adjacent the one sub-array. For calculation, nodes of the multiprocessor access only the data elements on the edges of the adjacent sub-arrays to be calculated which are located in a memory in other nodes.

A cache memory has been used in each node of the shared-memory multiproccssor to efficiently access main memories in the node itself and other nodes. The cache memory includes cache lines each consisting of a plurality of data elements stored at sequential memory addresses and accesses the main memory for each cache line to perform data processing. For example, when four data elements forming one cache line, access to the data elements on the vertical edges of two sub-arrays 102, 103 adjacent to the sub-array 101 to be processed by one node results in access to each group of four data elements, such as those designated as 112, 113, forming one cache line in the conventional data processor as shown in FIG. 10. Thus the conventional data processor has a large number of unnecessarily accessed data elements. This results in a significantly increased mount of communications and a significantly increased number of cache lines used for access to the data elements in adjacent sub-arrays.

In particular, the Jacobi relaxation changes the values of all data elements in all sub-arrays for each relaxation calculation cycle. Since data loaded into the cache memory in one node of the multiprocessor from another node are used only for one relaxation calculation cycle, the next relaxation calculation cycle requires new data elements to be loaded into the one node from another node. Such a large number of cache lines to be accessed greatly increase the processing time.

SUMMARY OF THE INVENTION

According to the present invention, a data processor comprises: a memory for storing data elements of a multi-dimensional array, the data elements having element numbers, respectively, in such a manner that some of the, data elements which are located on edges of the multi-dimensional array have sequential element numbers, the data elements being stored at sequential addresses as a function of the element numbers corresponding thereto; a buffet memory for fetching some of the data elements having the sequential element numbers from the memory to store the fetched data elements as one-line data elements; and a computing element for performing predetermined arithmetic processing in response to the one-line data elements storm in the buffer memory.

According to another aspect of the invention, a data processor comprises: a first memory for storing data elements of a first multi-dimensional array, the data elements having first element numbers, respectively, in such a manner that some of the data elements which are located on edges of the first multi-dimensional array have sequential element numbers, the data elements being stored at sequential addresses as a function of the first element numbers corresponding thereto; a first buffer memory for fetching some of the data elements having the sequential element numbers from the first memory to store the fetched data elements as one-line data elements; a first computing element for performing arithmetic processing in response to the one-line data elements stored in the first buffer memory; a second memory for storing data elements of a second multi-dimensional array adjacent to the first multi-dimensional array, the second data elements having element numbers, respectively, in such a manner that some of the data elements which are located on edges of the second multi-dimensional array data have sequential element numbers, the data elements being stored at sequential addresses as a function of the second element numbers corresponding thereto; a second buffer memory for fetching some of the data elements having the sequential element numbers from the second memory to store the fetched data elements as one-line data elements; a second computing element for performing arithmetic processing in response to the one-line data elements stored in the second buffer memory; and network means connected between the first buffer memory and the second buffer memory, wherein the first buffer memory and the second buffer memory access the second memory and the first memory through the network means to store some of the data elements which have sequential element numbers, respectively.

It is therefore an object of the present invention to constantly assign sequential element numbers to data elements on the edges of a multi-dimensional array which are required for predetermined arithmetic operation independently of the array size of the multi-dimensional array, to allow the data elements having such element numbers to be located at sequential memory addresses in accordance with the element numbers thereof.

It is another object of the invention to reduce the number of buffer lines or cache lines and the number of packets for a buffer memory or cache memory to transmit for holding and controlling groups of dam elements at sequential addresses in a memory in execution of arithmetic processing of the data elements on the edges of multi-dimensional arrays, accomplishing efficient data processing.

It is still another object of the invention to store, in a memory, data elements having element numbers assigned in spiral order in multi-dimensional array.

It is a further object of the invention, when the whole multi-dimensional array is partitioned into a plurality of sub-arrays (data element groups) and arithmetic processing is executed for accessing a large number of data elements on the edges of adjacent sub-arrays, to readily calculate element numbers of two adjacent data elements each in one of two adjacent sub-arrays, accomplishing efficient data processing.

It is a still further object of the invention to locate data elements in such a manner that each pair of data elements opposed across a boundary between adjacent multi-dimensional sub-arrays have the same element number by using four types of multi-dimensional array having the data elements numbered in spiral order in different directions to store the data elements in a memory at sequential addresses corresponding to the element numbers thereof, to readily calculate the element numbers of adjacent data elements in adjacent sub-arrays, accomplishing efficient data processing.

It is another object of the invention to provide a data processor applicable to a shared-memory multiprocessor system including a plurality of nodes wherein a smaller number of buffer lines or cache lines are used to hold a group of data elements provided by packet transmission between one node and another, permitting efficient use of a buffer memory or cache memory.

DESCRIPTION OF THE PREFERRED EMBODIMENTS

A data processor according to the present embodiments has characteristic arrangements to be described below.

(1) The data processor has such a data structure that all data elements on the edges of a multi-dimensional array have sequential element numbers and all data elements are located at sequential addresses of a memory corresponding to the element numbers thereof.

(2) The data processor has such a data structure that a plurality of data elements arranged in one region in the form of a multi-dimensional grid are partitioned into a plurality of data element groups (sub-arrays), and two data elements included in different data element groups and adjacent to each other across a boundary are disposed to have the same element number.

(3) The data processor is applicable to a shared-memory multiprocessor system including a plurality of nodes. When a node A accesses one of the data elements in the data element group which is a part of the whole two-dimensional array and contain a data element allocated to a memory of another node B, the data processor is adapted to locate the data elements included in the group in one or more areas having sequential memory addresses to reduce the number of cache lines treed for the node A to hold the group of data elements.

(4) The data processor numbers the data elements forming a two-dimensional array in spiral order to transform the two-dimensional array into a one-dimensional array, thereby storing the one-dimensional array at sequential memory addresses.

(5) The data processor manges all data elements in such a manner that when the plurality of data elements arranged in the form of a multi-dimensional grid partitioned by using four types of two-dimensional arrays having data elements numbered in spiral order in different directions, each pair of data elements opposed across a boundary between adjacent two-dimensional arrays have the same element number.

Figure 1:
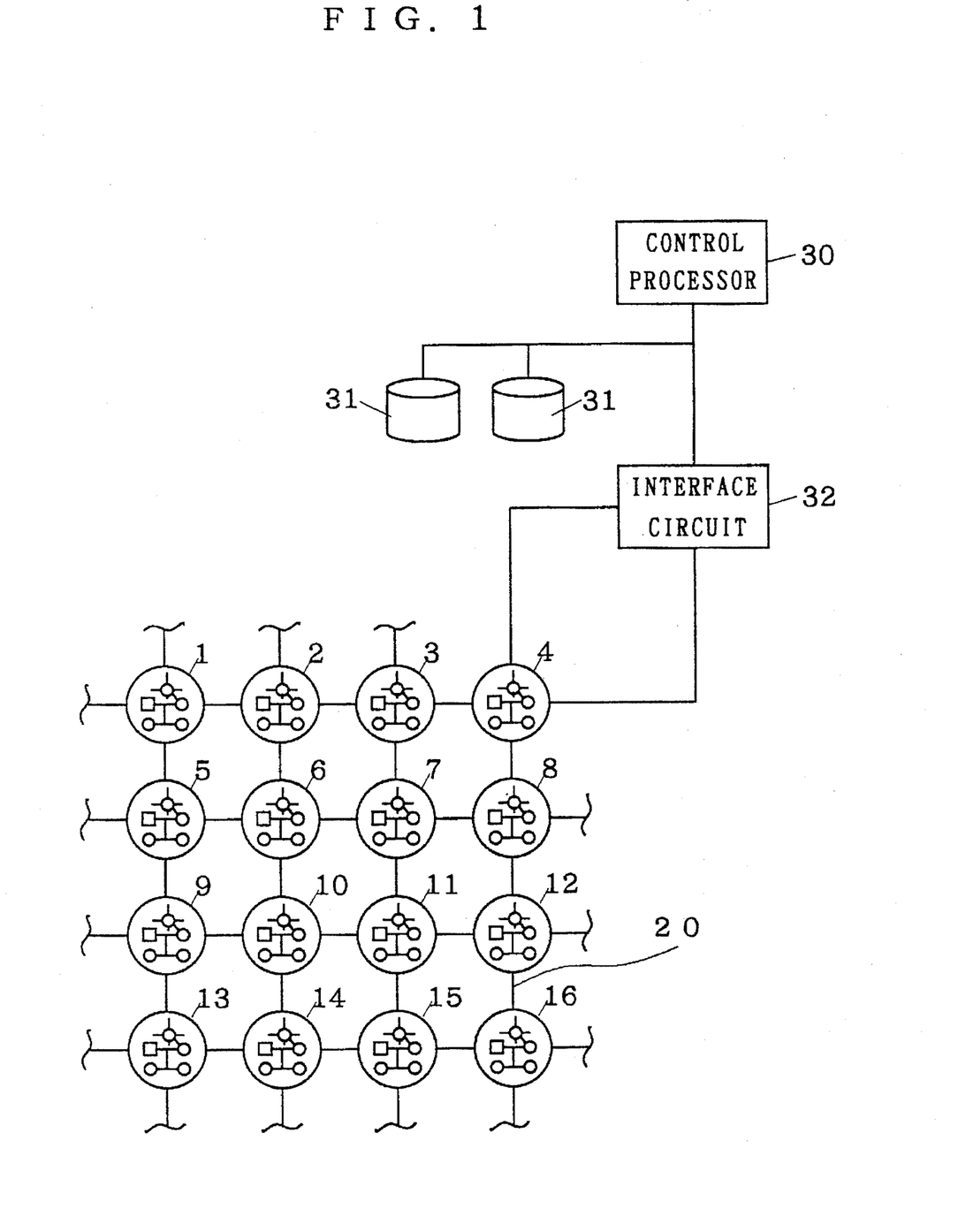
FIG. 1 is a block diagram of a general construction of a 16-node shared-memory multiprocessor system which is an example of a data processor according to the present invention.

The data processor according to a preferred embodiment of the present invention is applicable to a shared-memory multiprocessor system, and the whole structure of the system is shown in FIG. 1. The data processor illustrated in FIG. 1 is a shared-memory multiprocessor having 16 nodes. The 16 nodes 1 to 16 are connected in the form of a two-dimensional mesh through network interconnecting lines 20. The group of 16 nodes 1 to 16 is connected through an interface circuit 32 to a control processor 30 for reading data and programs from auxiliary memories 31 to transmit the data and programs to the group of nodes.

Figure 2:
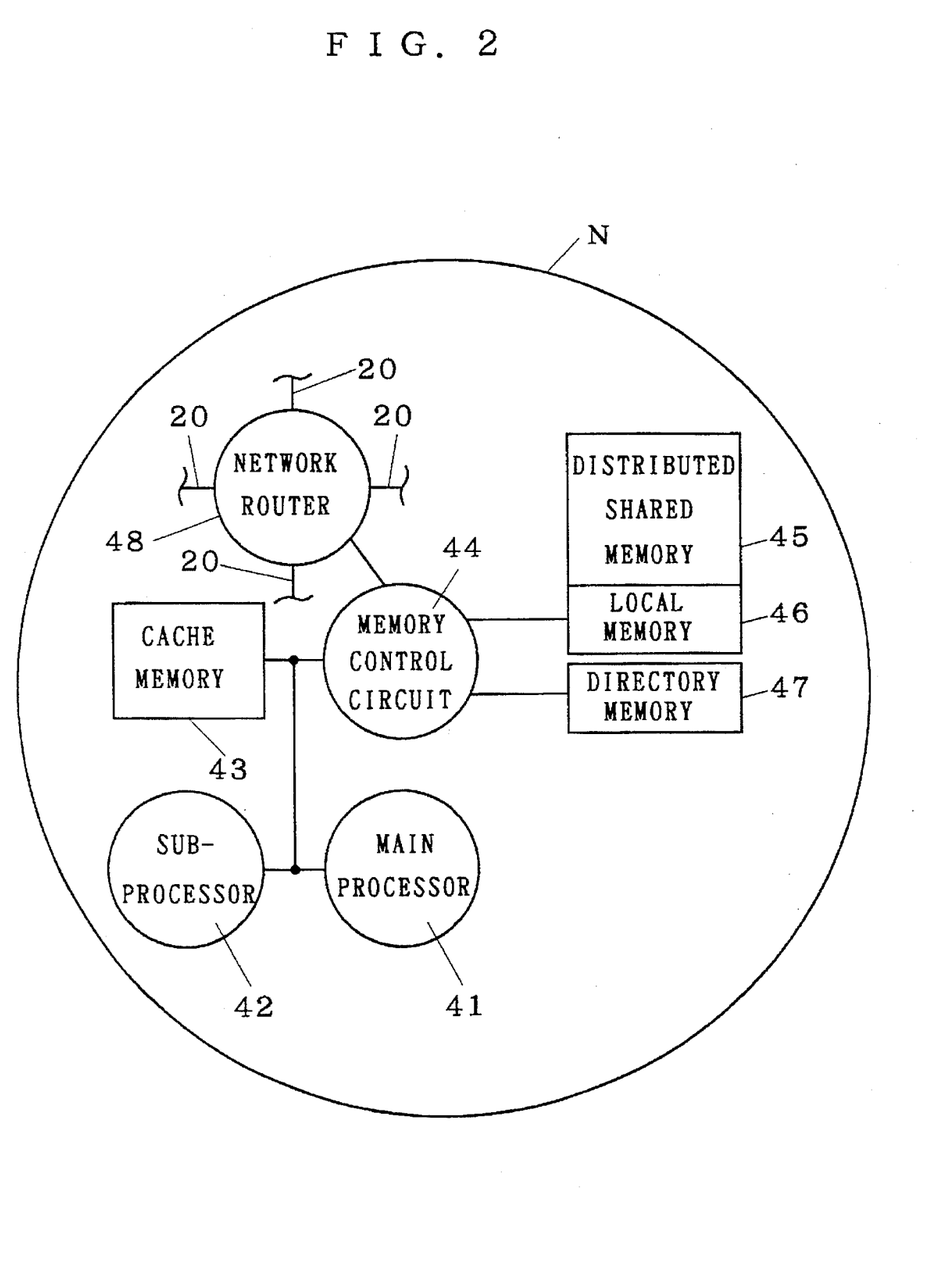
FIG. 2 is a block diagram of an internal construction of one node in the system of FIG. 1.

Each of the nodes 1 to 16 is generally referred to hereinafter as a node N, and the internal structure of the node N is shown in FIG. 2. The node N comprises a computing element including a main processor 41 and a co-processor 42, a distributed cache memory 43, a memory control circuit 44, a distributed shared memory (main memory) 45, a local memory 46, a directory memory 47, and a network router 48. The network router 48 permits the node N to be connected to a maximum of four other nodes through the network interconnecting lines 20, One line of the cache memory 43 (one cache line) is composed of 16 bytes. The cache memory 43 divides data elements (4-byte elements) indicative of data elements to be processed by a program such as Jacobi relaxation into groups each made up of four data elements located at sequential addresses to store four data elements of each group (one-line data elements) in each cache line.

The memories 45 to 47 form a memory in the node N, and the distributed shared memory 45 stores data elements indicative of the two-dimensional array data in a sub-array associated with the node N. The cache memory 43 and the memory control circuit 44 access the memory in another node through the network router 48 to sequentially store the read one-line data elements in each cache line in the cash memory 43. In this sense, the cache memory 43 and the memory control circuit 44 form a buffer memory for fetching a memory exterior to the node N to store a plurality of read data elements as a group. Assuming that the memory in another node is a memory accessed by the buffer memory in the node N, the memories 45 to 47 in the node N are referred to as another memory (second memory). It should be noted that, in general, the cache memory 43 and a portion of the memory control circuit 44 for controlling the cache memory 43 are sometimes referred to as a cache memory.

The main processor 41 and the co-processor 42 perform a predetermined arithmetic operation determined by a program such as Jacobi relaxation for the data elements of each cache line in the cache memory 43 and the data elements stored in the memory 45. The main processor 41 is a computing unit for calculation of integer portions, and the co-processor 42 is a computing unit for calculation of floating point portions.

The network router 48 and the respective network interconnecting lines 20 form a network unit.

In the data processor of this preferred embodiment, packet transmission between the nodes is used when one node performs data read and write operations on a memory in another node. Data in one cache line are contained in one packet, and read and write of all data elements in one cache line are performed by one packet transmission.

Further, in the data processor of this preferred embodiment, the node N includes the directory memory 47 to maintain coherency, or data uniformity, of the distributed cache memory 43. The directory memory 47 stores the numbers of nodes holding copies of a group of data elements (16 bytes) corresponding to each cache line of the distributed shared memory 45 in the node N.

Figure 3:
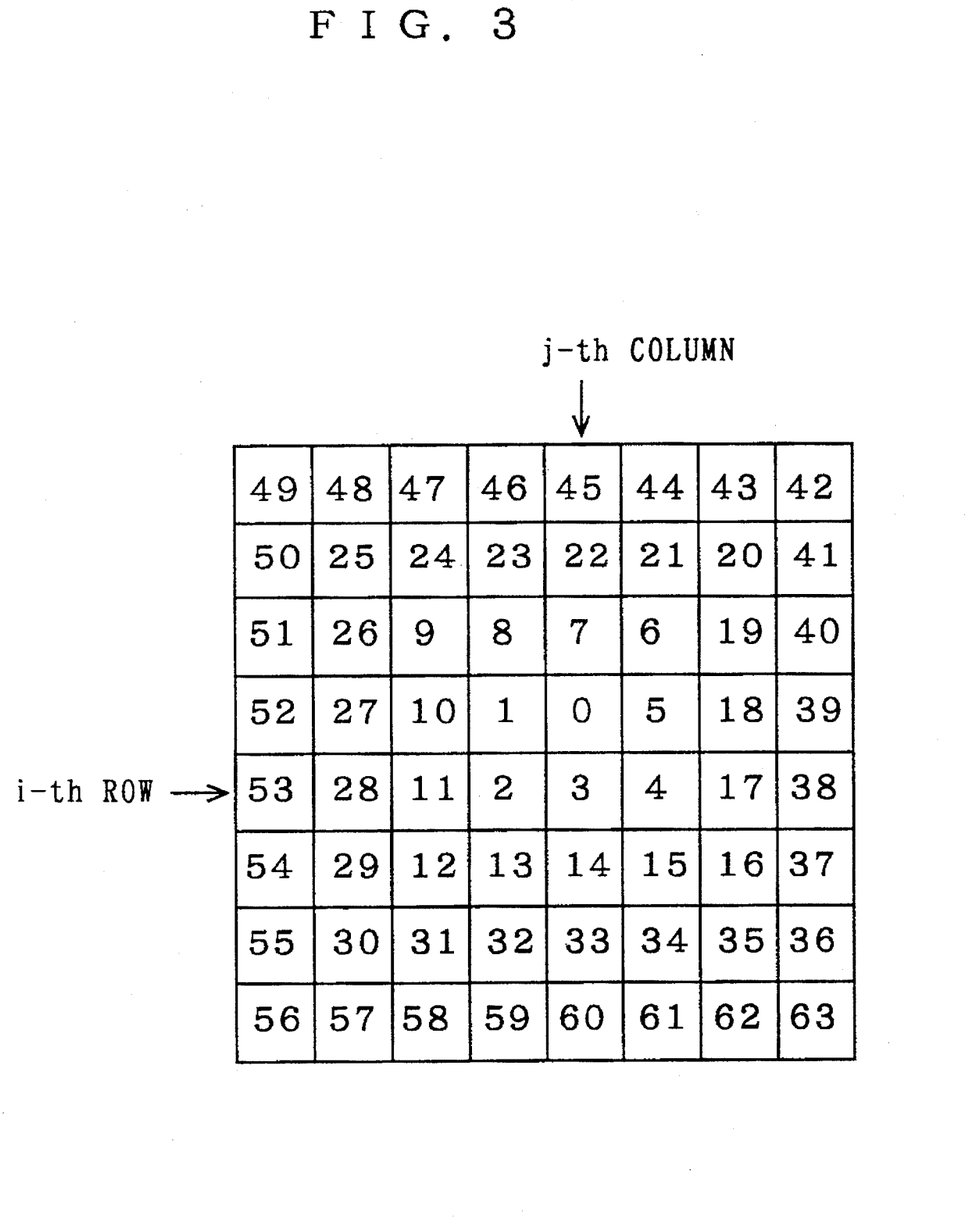
FIG. 3 illustrates a two-dimensional array data structure for use in the data processor of the present invention.
Figure 4:
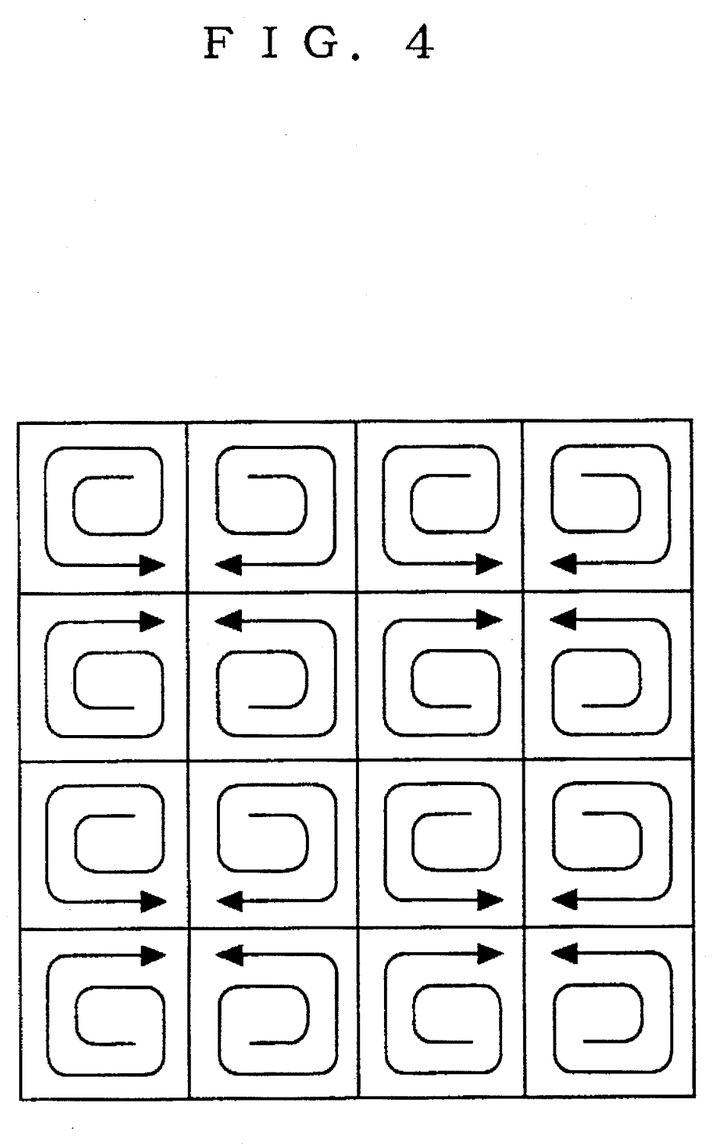
FIG. 4 conceptually illustrates a method of arranging data elements in sub-arrays provided by partitioning the whole two-dimensional array data into tiles.

FIG. 3 illustrates a two-dimensional array data structure for the data processor of this preferred embodiment. In the data processor of this preferred embodiment, a compiler numbers grid points B2 (i, j) of the two-dimensional array in spiral order to associate the grid points B2 (i, j) with one-dimensional grid points B1 (k), thereby transforming the two-dimensional array into a one-dimensional array. The numbers assigned to the data elements of the one-dimensional array are referred to as element numbers. The data elements are stored in the memory in accordance with the transformed one-dimensional element numbers. Thus, all of the data elements on the edges of the original two-dimensional array have sequential element numbers independently of the array size and, consequently, the data elements on the edges are sequentially, located in sequential storage areas (at sequential addresses) in the memory in accordance with the corresponding element numbers. In the data processor of the present invention, the numbering of some sub-arrays of the spiral data structure are symmetric with respect to the X-axis, the Y-axis, and the point of origin, whereby the grid points of the sub-arrays provided by partitioning the whole data array into tiles are numbered in spiral order of four types as shown in FIG. 4. Therefore, when the whole data array is partitioned into the plurality of tile-shaped sub-arrays to distribute loads to the nodes for processing a program based on Jacobi relaxation by the data processor of the present invention, each pair of data elements opposed across the boundary between two adjacent sub-arrays have the same element number.

Figure 5:
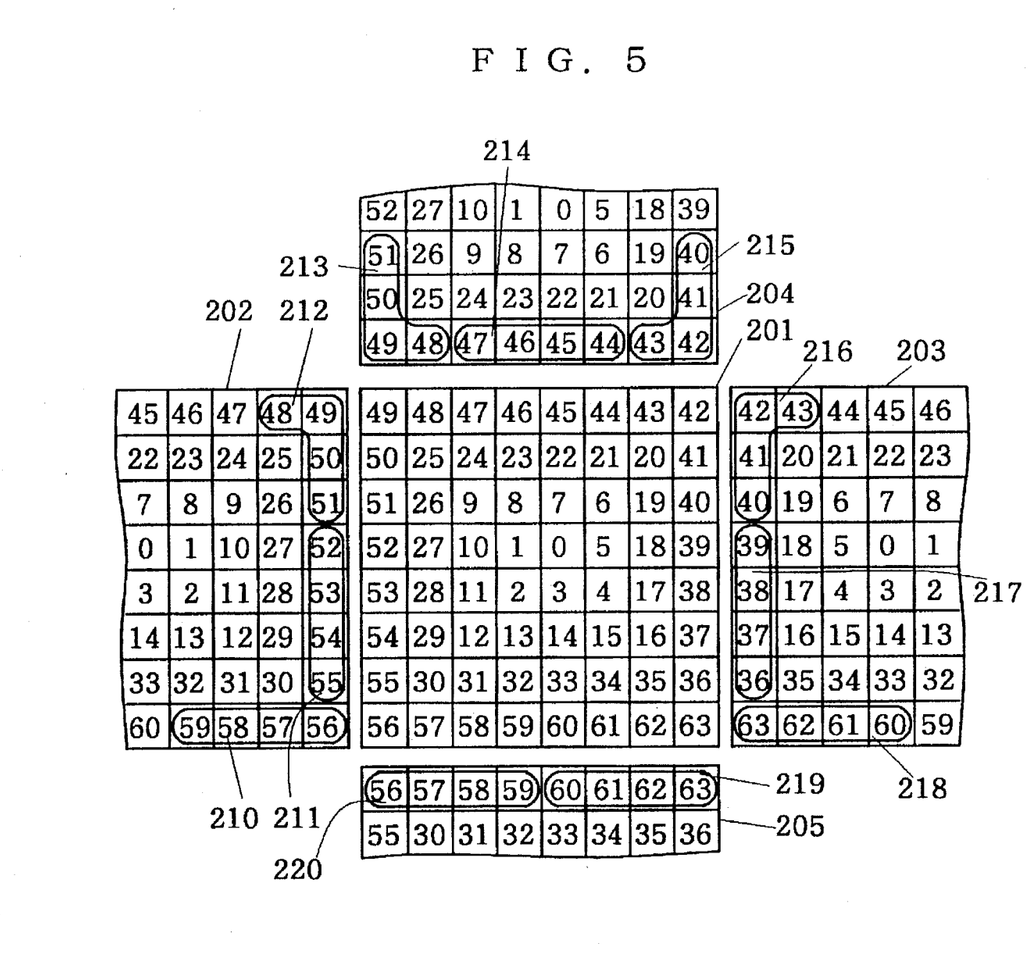
FIG. 5 illustrates an arrangement of data elements for the data processor according to the present invention, with the numbers of data elements of one of the sub-arrays of FIG. 4 and four adjacent sub-arrays in adjacent parts, and each group of data elements loaded into one cache line when data elements on the edges of the adjacent sub-arrays are accessed.

FIG. 5 illustrates the element numbers of the data elements in a sub-array 201 and the element numbers of the data elements adjacent the sub-array boundaries in four sub-arrays 202 to 205 adjacent the sub-array 201 when the data processor of this preferred embodiment processes Jacobi relaxation. It will be apparent from FIG. 5 that each pair of data elements opposed across the boundary between two adjacent sub-arrays have the same element number. Also understood from FIG. 5 is that the number of data groups 210 to 220 grouped for each cache line and loaded into the cache memory is significantly smaller than that in the conventional data processor of FIG. 10 when access is made to the data elements on the edges of the adjacent sub-arrays 202 to 265 which are required for calculating the data elements in the sub-array 201. Particularly in the Jacobi relaxation program, since the values of the data elements are updated for each relaxation calculation cycle, the data elements loaded into the cache memory are soon invalidated and data access to the distributed shared memory is carried out with increased frequency. Therefore it is particularly important for the Jacobi relaxation program to efficiently fetch the data elements from the distributed shared memory. In this sense, the data processor of the present invention sufficiently meets this requirement since the above described arrangement allows very efficient data access to the exterior of the node.

Assuming that the data elements are transmitted between two nodes Ni and Nj by means of the packet transmission, the memory, the buffer memory which is, for example, the cache memory, and the main processor and co-processor in the node Ni correspond respectively to a first memory, a first buffer memory, and a first computing element, and first data elements stored in the first memory at its first sequential addresses indicate that the two-dimensional array data elements having first element numbers are stored at the first sequential addresses. Likewise, the memory, the buffer memory, and the main processor and co-processor in the node Nj correspond respectively to a second memory, a second buffer memory, and a second computing element, and the second memory stores second data elements of a data structure similar to that of the first memory. In this case, a first two-dimensional array associated with the first data elements stored in the first memory and a second two-dimensional array associated with the second data elements stored in the second memory are adjacent to each other across the sub-array boundary therebetween.

(Modifications)

The preferred embodiment has described the data elements arranged in spiral order for transformation of the two-dimensional array into the one-dimensional array. For transforming a three-dimensional array into a one-dimensional array, the transformation of the arrays in any two of the three dimensions in spiral order permits sequential element numbers to be assigned to the data elements on the edges of the three-dimensional array, thereby providing efficient data access to the external memory of the processor node by means of the packet transmission, like the preferred embodiment.

Figure 6:
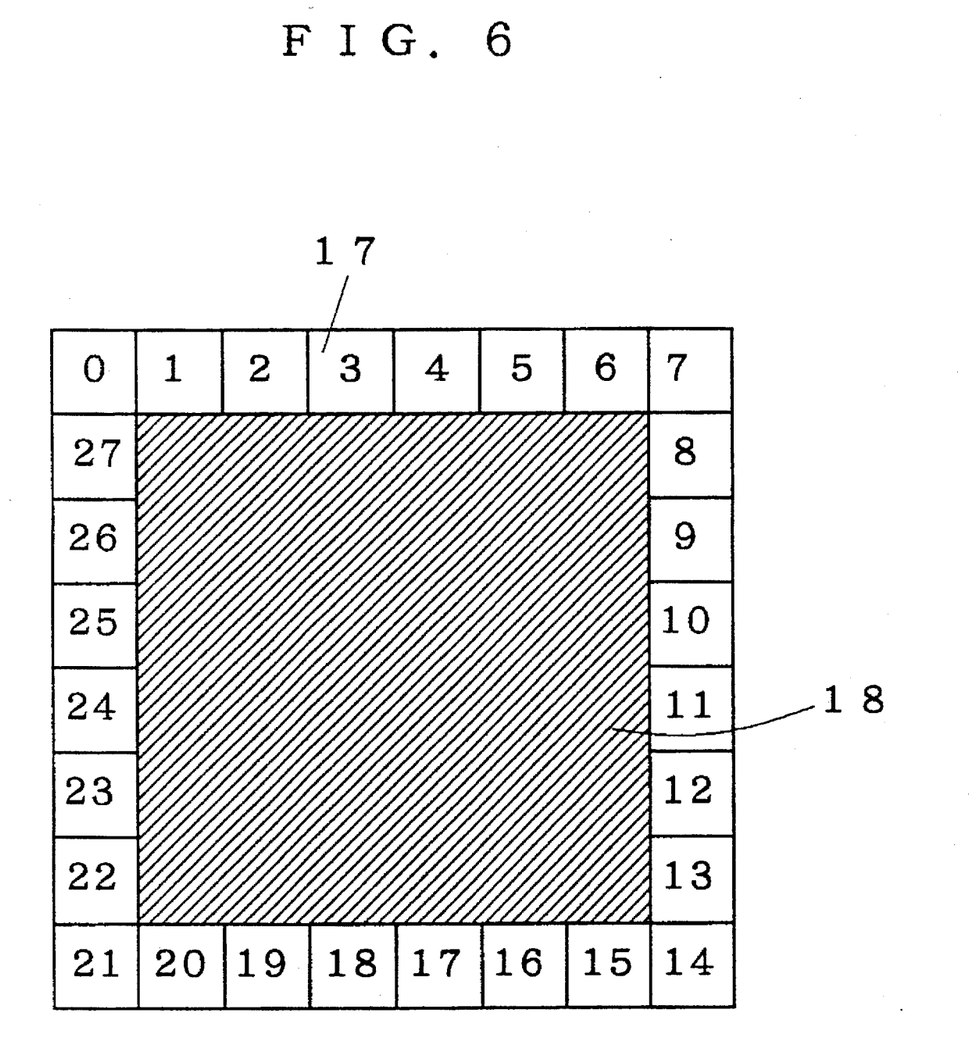
FIG. 6 illustrates another two-dimensional array data structure for use in the data processor of the present invention.

The preferred embodiment has assigned the sequential element numbers in spiral order to all of the data elements in the two-dimensional array to uniformly handle the data elements on the edges of the two-dimensional array and other data elements. Instead, as illustrated in FIG. 6, the data elements in the two-dimensional array may be separated into two groups, that is, a group of inside data elements 18 and a group of data elements 17 on the edges, the element numbers being assigned to the inside data elements 18 in conventional order in parallel to the rows and assigned to the data elements 17 on the edges in sequential order.

In the preferred embodiment, the data elements in the form of two-dimensional array B2 (i, j) are used in execution of the source program, and the compiler serving as basic software of the data processor numbers the data elements in spiral order when transforming the two-dimensional array B2 (i, j) into the one-dimensional array B1 (k). In the present invention, however, the data elements located on a two-dimensional plane associated with the physical meaning of a problem may be numbered in spiral order in the source program and then stored in a one-dimensional array.

(Advantages of Preferred Embodiment and Modifications)

The data processor of the present invention has such a data structure that all of the data elements on the edges of the multi-dimensional array have the sequential element numbers and the data elements are located at the sequential memory addresses corresponding to the element numbers thereof. This reduces the number of cache lines for the cache and the number of transmission packets which control groups of signals indicative of the plurality of data elements at the sequential addresses in execution of a program, such as classical relaxation, for accessing a large number of data elements on the edges of the multi-dimensional array, accomplishing efficient data processing.

In execution of a program, such as classical relaxation, required to partition a plurality of data elements arranged in one area in the form of multi-dimensional grid into a plurality of data element groups (sub-arrays) to access a large number of data elements on the edges of the multi-dimensional array, the data processor of the present invention has such a data structure that two data elements in different data element groups (sub-arrays) and adjacent to each other across the boundary therebetween have the same element number, to readily calculate the element numbers of the adjacent data elements in adjacent data element groups, accomplishing efficient data processing.

Further, the data processor of the present invention is applicable to the shared-memory multiprocessor system including the plurality of nodes in which when one node A accesses a data element in a group which is a part of an array of data elements stored in the memory of another node B, all of the data elements in the group are located in one or more areas at sequential memory addresses, to reduce the number of cache lines used for the node A to hold the group of data elements. The cache is efficiently used for data processing.

The data processor numbers the data elements in spiral order to re-arrange the data elements in the two-dimensional array into the one-dimensional array. This allows the data elements on the edges of the array to constantly have the sequential element numbers and allows the data elements to be located at the sequential memory addresses independently of the size of the two-dimensional array. In execution of the program, such as the classical relaxation, for accessing a large number of data elements on the edges of the two-dimensional array, the data processor reduces the number of cache lines for the cache and the number of transmission packets which control groups of the plurality of data elements at the sequential addresses, accomplishing efficient data processing.

Further, the data processor employs the arrangement of the data elements such that each pair of data elements opposed across the boundary between the adjacent two-dimensional arrays have the same element number by using four types of two-dimensional arrays having the data elements numbered in spiral order in different directions, readily calculating the element numbers of the adjacent data elements in the adjacent arrays for efficient data processing.

While the invention has been shown and described in detail, the foregoing description is in all aspects illustrative and not restrictive. It is therefore understood that numerous modifications and variations can be devised without departing from the scope of the invention.

What is claimed is:

1. A data processor comprising:

a memory for storing data elements of multi-dimensional array, said data elements having element numbers, respectively, in such a manner that some of said data elements which ate located on edges of an array of said multi-dimensional array have sequential element numbers, said data elements being stored at sequential addresses as a function of said element numbers corresponding thereto;

a buffer memory for fetching some of said data elements having said sequential element numbers from said memory to store the fetched data elements as one-line data elements; and computing means for performing predetermined arithmetic processing in response to said one-line data elements stored in said buffer memory.

2. The data processor of claim 1, wherein said buffer memory is a cache memory.

3. The data processor of claim 1, wherein said data elements of said multi-dimensional array are numbered in spiral order.

4. The data processor of claim 1, further comprising:

a second memory for storing second data elements of second multi-dimensional array having the same data structure as said multi-dimensional array, said second data elements being stored at corresponding sequential addresses in the same manner as said memory, wherein said multi-dimensional array and said second multi-dimensional array correspond to two groups of data elements in two adjacent ones of a plurality of sub-arrays into which a whole data array is partitioned, and wherein said computing means performs said predetermined arithmetic processing in response to sad one-line data elements read from said buffer memory and at least one of said second data elements read from said second memory.

5. A data processor comprising:

a first memory for storing first data elements of a first multi-dimensional array, said first data elements having first element numbers, respectively, in such a manner that some of said first data elements which are located on edges of said first multi-dimensional array have sequential element numbers, said first data elemetns being stored at first sequential addresses as a function of said first element numbers corresponding thereto;

a first buffer memory for fetching some of said first data elements having said first element numbers from said first memory to store the fetched first data elements as first one-line data elements;

first computing means for performing first arithmetic processing in response to said first one-line data elements stored in said first buffer memory;

a second memory for storing second data elements of a second multi-dimensional array adjacent to said first multi-dimensional array, said second data elements having second element numbers, respectively, in such a manner that some of said second data elements which are located on edges of said second multi-dimensional array have sequential element numbers, said second data elements being stored at second sequential addresses as a function of said second element numbers corresponding thereto;

a second buffer memory for fetching some of said second data elements having said second element numbers from said second memory to store the fetched second data elements as second one-line data elements;

second computing means for performing second arithmetic processing in response to said second one-line data elements stored in said second buffer memory; and network means connected between said first buffer memory and said second buffer memory, wherein said first buffer memory and said second buffer memory access said second memory and said first memory through said network means to store some of said second data elements and some of said first data elements, respectively.

* * * * *